UNITED STATES PATENT OFFICE 2,439,203

PROCESS FOR PRODUCING BETA-FLUORO-ETHYL THIOLACETATE

Ellsworth Knowlton Ellingboe, Wilmington, Del., assignor to E. I. du Pont de Nemours & Company, Wilmington, Del., a corporation of Delaware No Drawing. Application July 8, 1944, Serial No. 544,140

1 Claim. (Cl. 204—158)

This invention relates to a process for introducing thiol sulfur into a vinyl fluoride.

Beta-mercaptoethyl fluoride is a compound of interest in a number of ways, but the customary methods of preparing mercaptans from halogen compounds, such as ethylene chlorofluoride or bromofluoride, and sodium hydrosulfide are not satisfactory for the preparation of this compound.

This invention has as an object the preparation of beta-mercaptoethyl fluoride. A further object is to provide a process for its preparation in satisfactory yields. Other objects will appear hereinafter.

These objects are accomplished by the process of this invention which comprises reacting thiolacetic acid with vinyl fluoride in the presence of a photoactivating catalyst while being irradiated with ultraviolet light and hydrolyzing the resulting fluoroethyl thiolacetate.

The process is represented by the following equations:

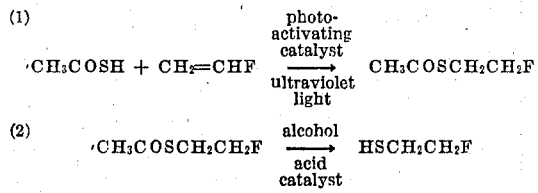

The preferred method of preparing beta-mercaptoethyl fluoride according to this invention comprises reacting a mixture of vinyl fluoride, thiolacetic acid, and benzoyl peroxide or other photoactivating agent as catalyst in the presence of ultraviolet light under reflux. The reaction is continued until it is approximately 40–45% complete, as indicated by analysis of a sample of the reaction mixture for thiol sulfur. After this degree of reaction has been reached, the rate of reaction becomes very slow. The unreacted ingredients may be recovered and recycled if desired. The resulting beta-fluoroethyl thiolacetic is isolated and hydrolyzed to beta-mercaptoethyl fluoride by heating it with an excess of an alcohol in the presence of dry hydrogen chloride as catalyst. The low-boiling beta-mercaptoethyl fluoride is distilled from the hydrolysis mixture at reduced pressure.

The ordinary grades of reagents and catalysts may be used in this process. It is not necessary to use highly purified materials. Vinyl fluoride containing a small amount of acetylene has been found satisfactory. Thiolacetic acid which has been redistilled to remove acetic acid and has a boiling range of 86–87° C. is satisfactory. The photoactive catalysts commercially available such as, for example, benzoyl peroxide, are satisfactory.

The more detailed practice of the invention is illustrated by the following example, wherein parts given are by weight. There are, of course, many forms of the invention other than this specific embodiment.

Example

A reaction vessel of borosilicate glass of about 96% combined silica is cooled in a mixture of solid carbon dioxide and acetone and charged with 208 parts of thiolacetic acid and 2 parts of butyl disulfide. To the cold mixture is added 140 parts of vinyl fluoride and the flask connected to a reflux condenser cooled with a mixture of solid carbon dioxide and acetone. The outlet of the condenser is connected to a trap immersed in carbon dioxide-acetone mixture. The cooling bath is removed and the reaction mixture exposed to the light of a 100 watt mercury arc sunlamp placed outside and in close proximity to the reaction vessel so as to obtain the maximum possible irradiation. After refluxing for 3 hours while being irradiated, the weight of the reaction mixture is found to have increased by 54 parts. The volatile material collected in the cold trap is replaced in the reaction mixture and the irradiation is continued for another 6 hours but no further increase in weight is obtained. The reaction mixture is distilled and 118 parts of fluoroethyl thiolacetic boiling at 80–87° C. at 100 mm. pressure is obtained. Including another 25 parts of the fluoroethyl thiolacetate which is in a preliminary fraction boiling at 39–80° C. at 100 mm., the total conversion obtained is 42.8% with a yield of 75% (based on thiolacetic acid). Analyses (made on a specially fractionated sample boiling at 87° C. at 100 mm.) are as follows:

$n_D^{25}$ 1.4525, $D_4^{25}$ 1.4041

Calculated for $C_4H_7OSF$: S, 26.3% $M_D$ 28.64
Found: S, 25.71% $M_D$ 28.87

A mixture of 83.5 parts of fluoroethyl thiolacetate (obtained as described above) and 106 parts of cyclohexanol is placed in a reaction vessel fitted with a reflux condenser and dry hydrogen chloride gas passed in until 2 parts is dissolved. The mixture is heated at 60° C. for 20 hours. The low-boiling beta-mercaptoethyl fluoride formed is distilled out of the reaction mixture rapidly at a pressure of 220 mm. in order to minimize decomposition. The crude product is redistilled and a 74.4% yield (based on fluoroethyl thiolacetate) of beta-mercaptoethyl fluoride boiling at 38.5° C./225 mm. is obtained. Analyses (of a specially purified sample) are as follows:

$n_D^{25}$ 1.4288, $D_4^{25}$ 1.082

|  | Calculated for $C_2H_5SF$ | Found |
|---|---|---|
| S (total) per cent | 40.0 | 39.9 |
| S (thiol) do | 40.0 | 38.7 |
| F do | 23.5 | 23.1 |
| $M_D$ | 19.07 | 19.03 |

Other thiolcarboxylic acids which are stable under the conditions of the reaction may be used instead of thiolacetic acid, including thiolpropionic acid, thiolbutyric acid, thiolbenzoic acid, etc. Since the acid serves only to introduce the thiol sulfur in the final product and is consumed in the reaction, it is preferable for economic reasons to use the cheapest and most economical acid. For this reason, thiolacetic acid is preferred.

At least equal molar proportions of vinyl fluoride to thiolacetic acid should be used. If desired, an excess of vinyl fluoride may be used as it is the lower boiling ingredient and is therefore easier to recover.

The reaction between vinyl fluoride and thiolacetic acid must be conducted in the presence of ultraviolet light. Whereas vinyl chloride reacts with thiolacetic acid in the presence of either air or a peroxide catalyst, without irradiation, vinyl fluoride does not react under these conditions. The reaction will not take place unless the reaction mixture, containing a photoactivating catalyst, is irradiated with ultraviolet light.

Any irradiating device may be used provided the light it emits contains at least some radiation of ultraviolet or near ultraviolet wavelength, i. e., of wavelength between about 0.015 and 0.4 micron. Commercial mercury arc sunlamps are satisfactory. Certain ordinary light sources which emit some ultraviolet light, such as a 400-watt tungsten spotlight may be used satisfactorily though their effect is less intense. For best results, the reaction vessel and the light source should be arranged so as to obtain the maximum irradiation of the reaction mixture. The light source may be placed inside the reaction vessel, if desired with a suitable cooling device, or it may be placed outside the reaction vessel, in which case the latter should be made of a material (e. g., quartz or borosilicate glass of about 96% combined silica) which transmits ultraviolet light.

Catalysts which are suitable for this reaction in addition to the butyl disulfide mentioned in the example, are any of the photoactivating catalysts such as benzoyl peroxide, acetyl peroxide, benzoin, diacetyl, ascaridole, di-para-tolyl disulfide, etc. In general, from 0.5 to 5% of catalyst based on the weight of the thiolcarboxylic acid is sufficient. Fresh catalyst may be added from time to time if it appears that the reaction is becoming undesirably slow.

The reaction can be conducted at atmospheric or superatmospheric pressures if desired, but it is preferred that the reaction be conducted in the liquid phase, i. e. at temperatures and pressures such that the reactants are liquid. The temperature, however, must not exceed that of the decomposition point of either the reactants or products. Temperatures of less than 100° C. are preferred.

The reaction proceeds readily until about 40-45% complete where it appears to reach a point of equilibrium since further refluxing and irradiation produces only an insignificant further reaction. The progress of the reaction is conveniently followed by titrating, with standard iodine solution, the amount of thiol sulfur present in a sample of the reaction mixture. The unreacted ingredients can, if desired, be isolated from the reaction product and recycled.

A solvent or diluent may be used if desired. Any inert, organic solvent is satisfactory. Such solvents include benzene, toluene, cyclohexane, chloroform, carbon tetrachloride, ether, etc.

The hydrolysis of the beta-fluoroethyl thiolacetate may be carried out as described in the example after its isolation from the reaction mixture of the first step of this invention or the crude reaction mixture may be used directly. While the example illustrates the hydrolysis of the thiol ester by an ester interchange reaction using cyclohexanol in the presence of hydrogen chloride as catalyst, other alcohols, for example methanol, butanol, etc., and other acid catalysts such as sulfuric and para-toluenesulfonic acids, etc., may also be used. The amount of alcohol used may be that stoichiometrically equivalent to the fluoroethyl thiolacetate if desired, but it is preferred to use an excess. The excess thus serves as a solvent for the reaction.

The resulting beta-mercaptoethyl fluoride is useful as an intermediate for the synthesis of other compounds.

The above description and example are intended to be illustrative only. Any modification thereof or variation therefrom which conforms to the spirit of the invention is intended to be included within the scope of the claim.

What is claimed is:

A process which comprises irradiating, with light of wave length in the range 0.015 to 0.4 micron, a liquid reaction mixture of vinyl fluoride, thiolacetic acid and from 0.5 to 5%, based on the thiolacetic acid of butyl disulfide, and isolating beta-fluoroethyl thiolacetate.

ELLSWORTH KNOWLTON ELLINGBOE.

REFERENCES CITED

The following references are of record in the file of this patent:

UNITED STATES PATENTS

| Number | Name | Date |
|---|---|---|
| 2,094,467 | Reppe et al. | Sept. 28, 1937 |
| 2,352,435 | Hoeffelman et al. | June 27, 1944 |
| 2,392,554 | Schulze | Jan. 8, 1946 |
| 2,392,555 | Schulze | Jan. 8, 1946 |
| 2,398,480 | Vaughan et al. | Apr. 16, 1946 |
| 2,406,362 | Farlow et al. | Aug. 27, 1946 |
| 2,427,309 | Schulze | Sept. 9, 1947 |

OTHER REFERENCES

Vaughan et al.: "Journal of Organic Chemistry," vol. 7 (1942), pages 472-476.

Beilstein: "Handbuch der Organischen Chemie," 4th edition, vol. 1, page 186.

Certificate of Correction

Patent No. 2,439,203.

April 6, 1948.

ELLSWORTH KNOWLTON ELLINGBOE

It is hereby certified that errors appear in the printed specification of the above numbered patent requiring correction as follows: Column 1, line 43, and column 2, line 34, for the word "thiolacetic" read *thiolacetate*; and that the said Letters Patent should be read with these corrections therein that the same may conform to the record of the case in the Patent Office.

Signed and sealed this 1st day of June, A. D. 1948.

[SEAL]

THOMAS F. MURPHY,
*Assistant Commissioner of Patents.*